US010080238B2

(12) United States Patent
Levy et al.

(10) Patent No.: US 10,080,238 B2
(45) Date of Patent: Sep. 18, 2018

(54) DISTRIBUTED RESERVATION CONTENTION ACCESS (DRCA) FOR WIRELESS LOCAL AREA NETWORK (WLAN) CARRIER SENSE MULTIPLE ACCESS (CSMA) STATIONS (71) Applicant: INTERDIGITAL PATENT HOLDINGS, INC., Wilmington, DE (US)

(72) Inventors: Joseph S. Levy, Merrick, NY (US); Joseph A. Kwak, Bolingbrook, IL (US); Ronald Murias, Calgary (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/035,123

(22) PCT Filed: Nov. 7, 2014

(86) PCT No.: PCT/US2014/064670
§ 371 (c)(1),
(2) Date: May 6, 2016

(87) PCT Pub. No.: WO2015/070087
PCT Pub. Date: May 14, 2015

(65) Prior Publication Data
US 2016/0330765 A1 Nov. 10, 2016

Related U.S. Application Data (60) Provisional application No. 61/902,033, filed on Nov. 8, 2013.

(51) Int. Cl.
*H04W 28/04* (2009.01)
*H04W 74/04* (2009.01)
(Continued)

(52) U.S. Cl.
CPC ......... *H04W 74/04* (2013.01); *H04W 74/006* (2013.01); *H04W 74/085* (2013.01); *H04W 76/15* (2018.02); *H04W 88/06* (2013.01)

(58) Field of Classification Search
CPC . H04W 74/04; H04W 76/025; H04W 28/044; H04W 28/0268; H04L 5/0053
See application file for complete search history.

(56) References Cited

U.S. PATENT DOCUMENTS 6,611,521 B1  8/2003 McKay et al.
7,068,633 B1  6/2006 Ho
(Continued)

FOREIGN PATENT DOCUMENTS

EP  1615395  1/2006
EP  1662709  5/2006
WO  95/32567  11/1995

OTHER PUBLICATIONS

IEEE Standard for Information technology—Telecommunications and information exchange between systems—Local and metropolitan area networks—Specific requirements; Part 11 Wireless LAN Medium Access Control (MAC) and Physical Layer (PHY) Specifications, IEEE Std. 802.11-2012 (Mar. 29, 2012).
(Continued)

*Primary Examiner* — Wei Zhao
(74) *Attorney, Agent, or Firm* — Volpe and Koenig, P.C.

(57) ABSTRACT

A method and apparatus are disclosed for enabling high-efficiency communication in wireless local area network (WLAN) systems. A station (STA) may receive an Uplink Priority List (UPL) from an access point (AP). In one example embodiment, a STA may send a request for prioritized access to an AP. The STA may then receive an ordered queue of STAs granted contention free prioritized access in a predetermined time interval, which may be referred to as the Exclusive Priority Access (EPA) period. The STA may
(Continued)

then determine whether it is identified in the ordered queue of STAs granted prioritized access. The STA may then access a medium such as a Carrier Sense Multiple Access (CSMA) wireless medium associated with the IEEE 802.11 network, in turn with other STAs in the ordered queue per the queue order during the predetermined time interval using an inter-frame spacing, thereby enabling contention free access.

20 Claims, 9 Drawing Sheets

(51) Int. Cl.
    *H04W 74/00*     (2009.01)
    *H04W 74/08*     (2009.01)
    *H04W 76/15*     (2018.01)
    *H04W 88/06*     (2009.01)

(56) References Cited

U.S. PATENT DOCUMENTS

| | | |
|---|---|---|
| 2007/0047570 A1 | 3/2007 | Benveniste |
| 2009/0168744 A1 | 7/2009 | Park |
| 2011/0205998 A1* | 8/2011 | Hart ................ H04W 72/1226 370/330 |
| 2012/0063433 A1 | 3/2012 | Wentink |
| 2014/0334387 A1* | 11/2014 | Doppler ............ H04W 74/0816 370/329 |
| 2015/0016268 A1* | 1/2015 | Merlin .............. H04W 28/0268 370/236 |

OTHER PUBLICATIONS

IEEE Standard for WirelessMAN—Advanced Air Interface for Broadband Wireless Access Systems Amendment 2: Higher Reliability Networks, IEEE Std 802.16.1a-2013 (Mar. 6, 2013).

Vu et al., "Collision Probability in Saturated IEEE 802.11 Networks", Australian Telecommunication Networks & Applications Conference (ATNAC), Australia, ISBN/ISSN 0977586103, (Dec. 2006).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

* cited by examiner

DISTRIBUTED RESERVATION CONTENTION ACCESS (DRCA) FOR WIRELESS LOCAL AREA NETWORK (WLAN) CARRIER SENSE MULTIPLE ACCESS (CSMA) STATIONS

CROSS REFERENCE TO RELATED APPLICATIONS

This application is the U.S. National Stage, under 35 U.S.C. § 371, of International Application No. PCT/US2014/064670 filed Nov. 7, 2014, which claims the benefit of U.S. Provisional Application Ser. No. 61/902,033 filed Nov. 8, 2013, the contents of which are hereby incorporated by reference herein.

BACKGROUND

The Institute of Electrical and Electronics Engineers (IEEE) 802.11 High Efficiency Wireless Local Area Network (WLAN) (HEW) Study Group (also known as 802.11ax) is investigating solutions to the current inefficiencies of Carrier Sense Multiple Access (CSMA) as the primary IEEE 802.11 channel assess technology. CSMA, while providing simple and fair channel access in lightly loaded channels, degrades channel access efficiency and throughput when the channel is overloaded, i.e., when there are more STAs, more APs, and more traffic demand than the channel can accommodate. Many of the HEW use cases (stadium, train station, public street hotspot, etc.) under discussion consider hundreds of STAs in the range of the operating AP. This may lead to degraded channel access efficiencies as low as 10-20%.

SUMMARY

A method and apparatus are disclosed that enable high-efficiency communication in wireless local area network (WLAN) systems by enabling scheduled priority access. A station (STA) may receive an Uplink Priority List (UPL) from an access point (AP). The STA may determine its position on the UPL, wherein its position indicates an order of access. An access priority may be a time period assigned for exclusive use by one STA at a time, which hereinafter may be referred to as the Exclusive Priority Access (EPA) period. The STA may receive an indication from the STA(s) preceding it on the UPL, which may indicate that the STA(s) preceding it on the UPL have completed their transmissions. When the STA receiving the indication that the STA(s) positioned directly preceding it on the UPL has completed its transmission, the STA may wait the EPA period and then begin to transmit packets during the contention-free period. After completing the transmission of its packets, the STA may send an indication that it has completed its transmission. The priority access delay time may enable the STA to access the wireless medium without contending for the wireless medium with other STAs in the WLAN.

In one example embodiment for scheduled priority access, a STA may send a request for prioritized access to an AP. The STA may then receive an ordered queue of STAs granted contention free prioritized access in a predetermined time interval (e.g. the EPA period). The STA may then determine whether it is identified in the ordered queue of STAs granted prioritized access. The STA may then access a wireless medium such as a Carrier Sense Multiple Access (CSMA) wireless medium associated with the IEEE 802.11 network, in turn with other STAs in the ordered queue per the queue order during the predetermined time interval (e.g., the EPA period) using a priority inter-frame spacing, thereby enabling contention free access.

BRIEF DESCRIPTION OF THE DRAWINGS

A more detailed understanding may be had from the following description, given by way of example in conjunction with the accompanying drawings wherein.

DETAILED DESCRIPTION

Figure 1A:
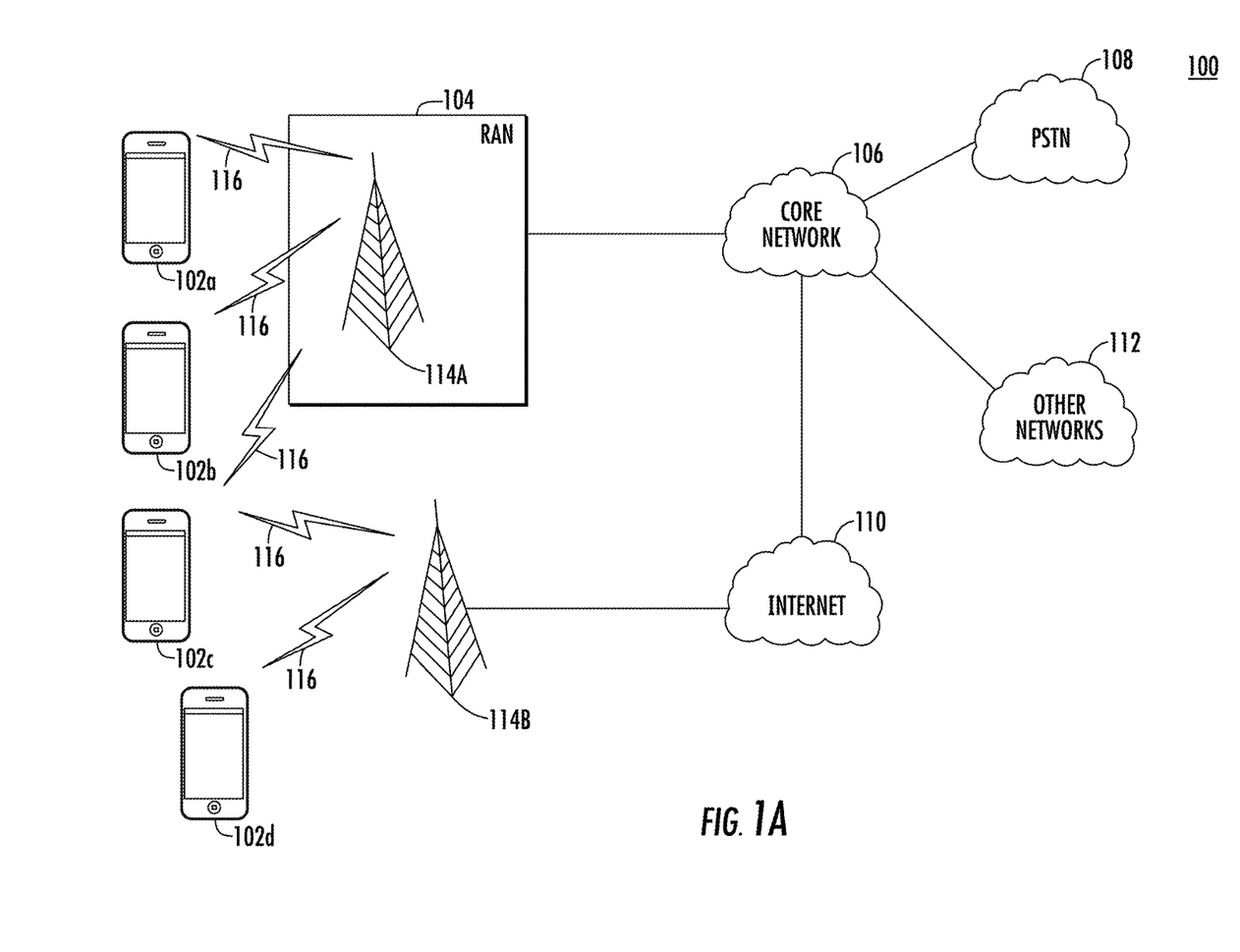
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
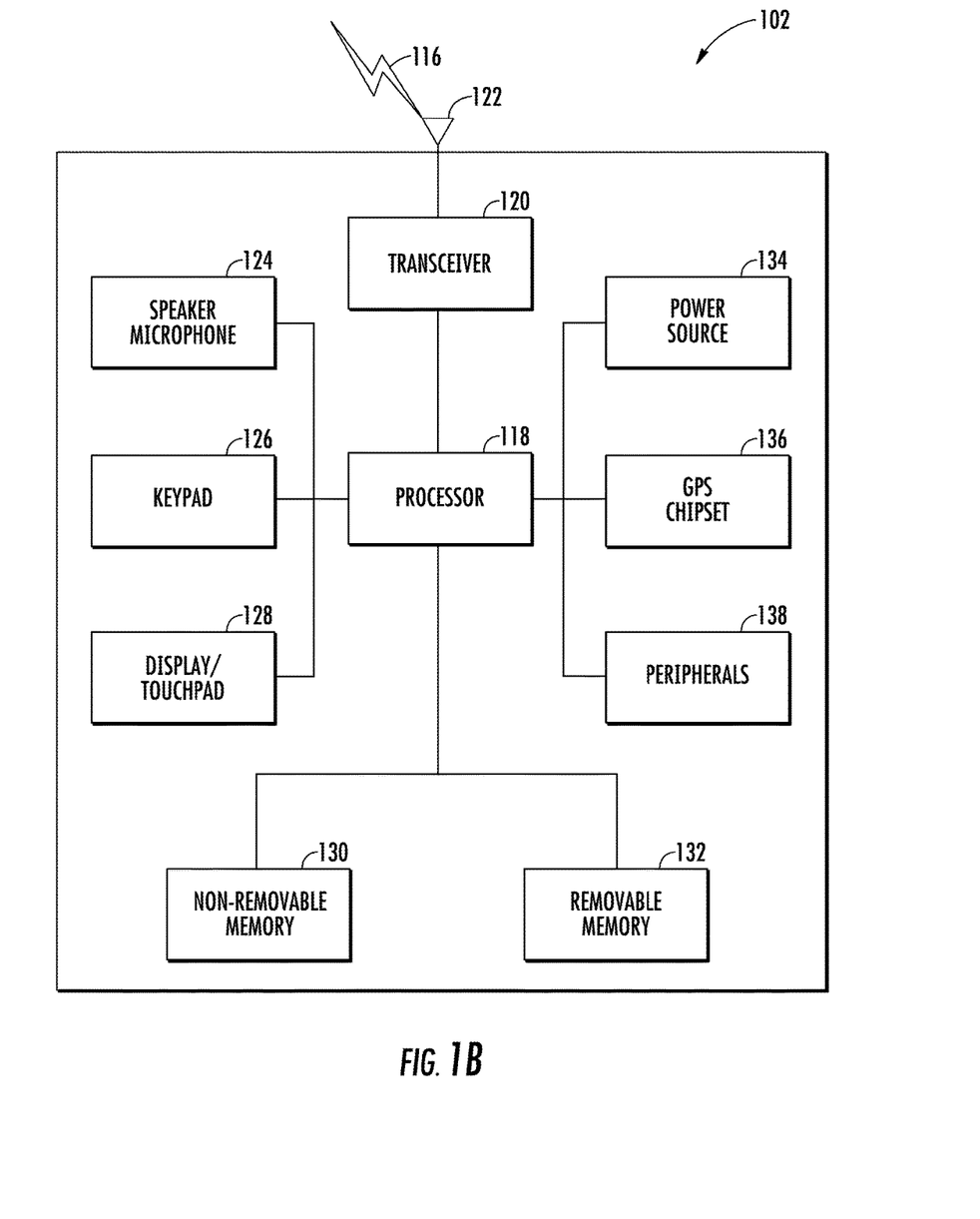
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120 (or transmitter and receiver), a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
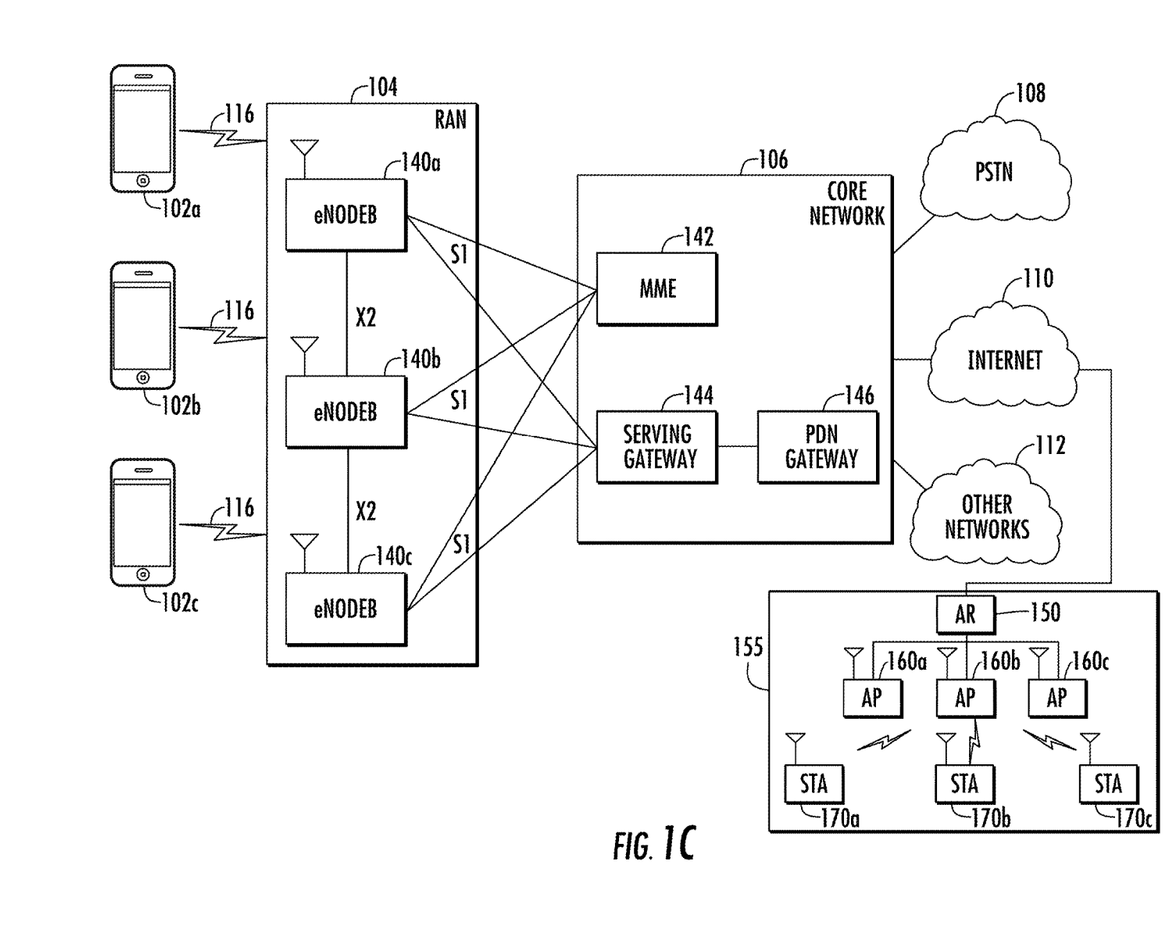
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c. The STAs 170a, 170b, 170c may be dual mode WLAN devices capable of performing WLAN operations while also being able to perform LTE operations like the WTRUs 102a, 102b, 102c. The APs 160a, 160b, and 160c and STAs 170a, 170b, and 170c may be configured to perform the methods disclosed herein.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Herein, the terminology "STA" includes but is not limited to a wireless transmit/receive unit (WTRU), a user equipment (UE), a mobile station, a fixed or mobile subscriber unit, an AP, a pager, a cellular telephone, a personal digital assistant (PDA), a computer, a mobile Internet device (MID) or any other type of user device capable of operating in a wireless environment.

An efficient scheme is disclosed herein providing access efficiencies to rival cellular or point coordination function (PCF) access but without using a central control function. This approach modifies the traditional CSMA timing function for channel access to permit immediate, high efficiencies for STAs implementing this functionality (e.g. HEW STAs that understand the functions/provisions described herein) when operating in the presence of legacy STAs that operate according to existing channel access procedures, which may include CSMA.

Figure 2A:
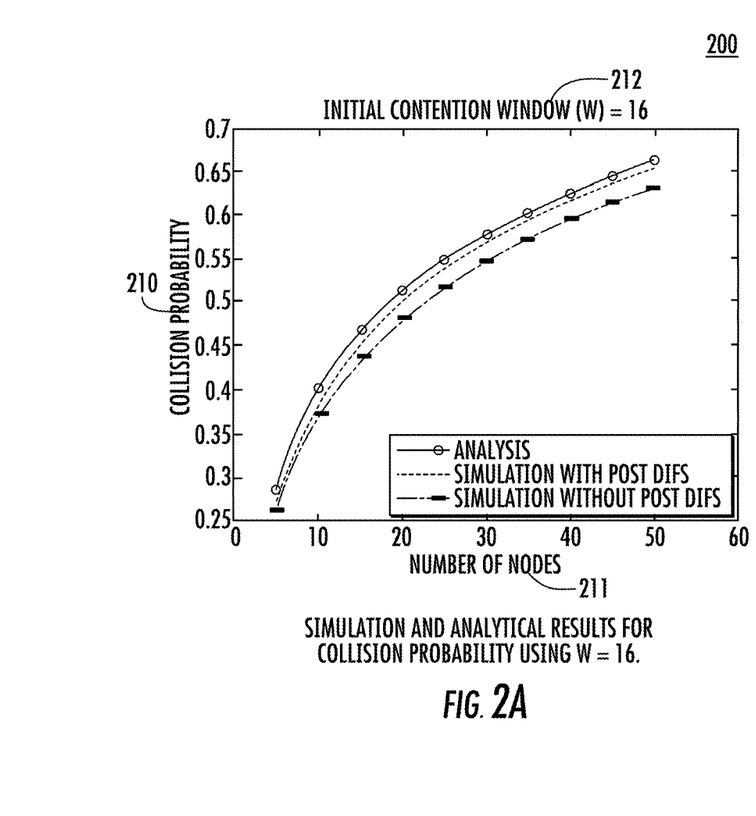
FIG. 2A is a diagram of collision probabilities in an overloaded channel.
Figure 2B:
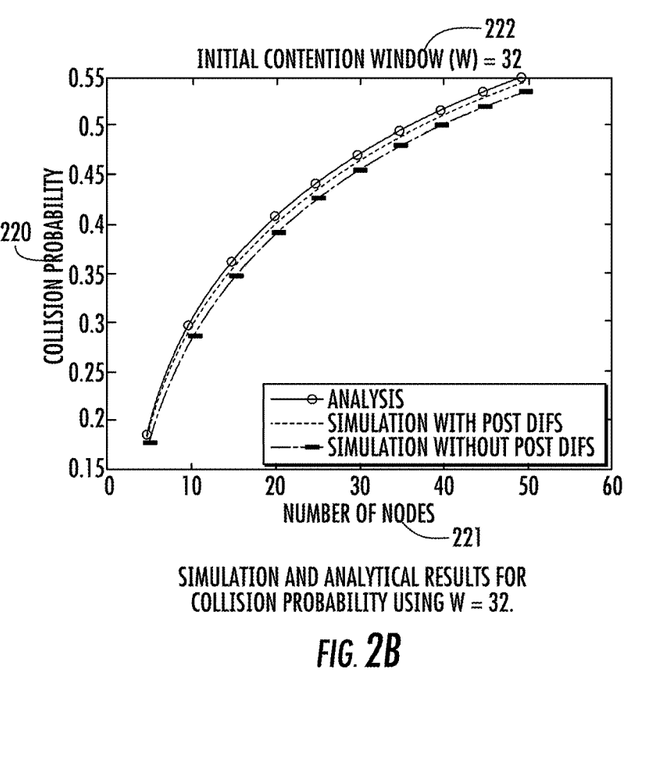
FIG. 2B is another diagram of collision probabilities in an overloaded channel.

FIGS. 2A-2B are diagrams of simulation results 200 for an example HEW system having a large number of STAs. FIG. 2A shows results for collision probability 210 for various numbers of nodes 211 with an initial contention window 212 of 16 slots. FIG. 2B shows results for collision probability 220 for various numbers of nodes 221 with an initial contention window 222 of 32 slots.

As seen in FIGS. 2A and 2B, having a large number of nodes may lead to degraded channel access efficiencies due to the increase in collision probability. These may lead to degraded channel access efficiencies as low as 10-20%. In FIGS. 2A and 2B, the maximum channel efficiency is equal to 1-Collision Probability.

Figure 3A:
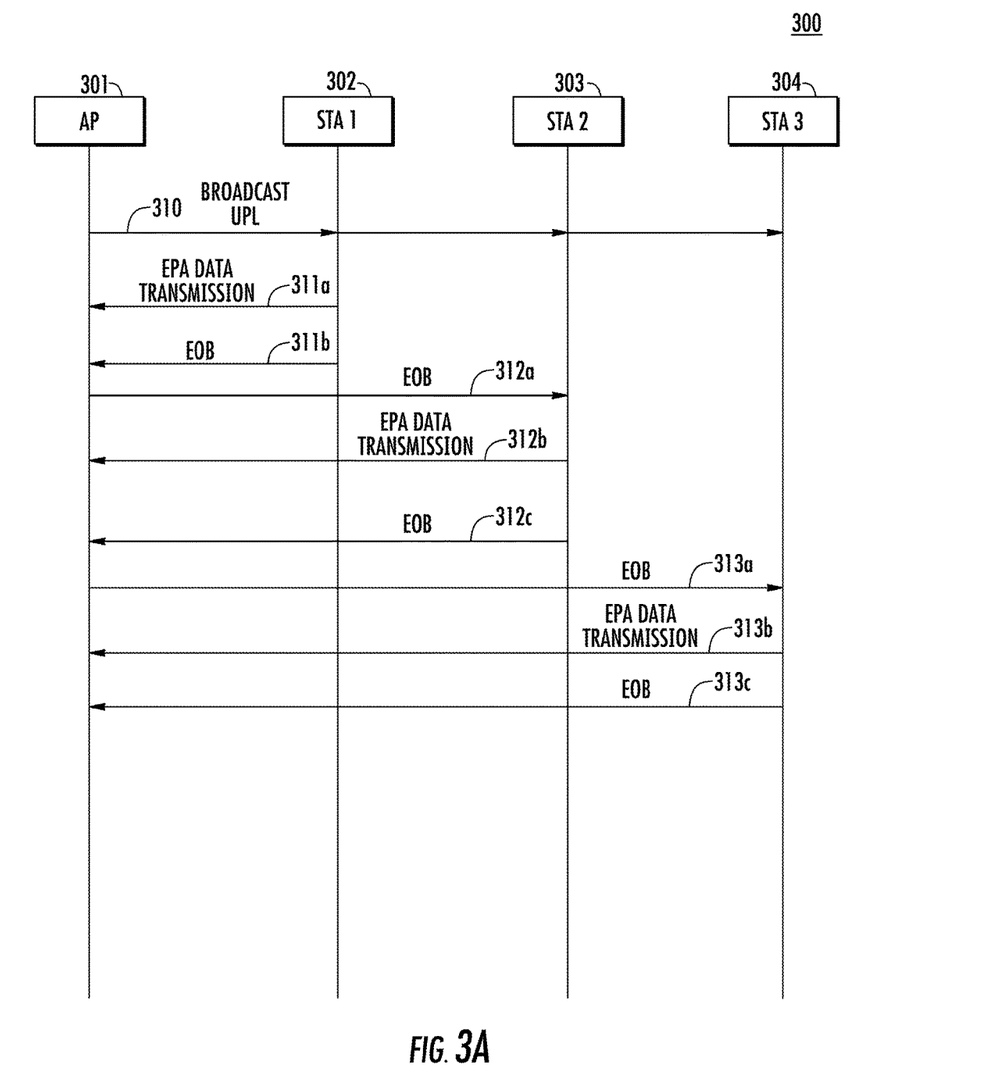
FIG. 3A is an example call flow diagram of a procedure to enable elimination of contention in a manner that is compatible with the current carrier sense multiple access (CSMA) scheme.

FIG. 3A is an example call flow diagram of a procedure 300 to enable elimination of contention in a manner that is compatible with the current 802.11 CSMA scheme in accordance with a sequential Exclusive Priority Access (EPA) embodiment. The procedure of FIG. 3A may use an access priority that is higher than all other defined CSMA access priorities to provide contention free access to the channel for a designated STA. In this example, use of this highest access priority may be a time period assigned for exclusive use by one STA at a time, which hereinafter may be referred to as the EPA period. For example, when the single STA assigned the EPA period is an AP, then the AP may transmit the downlink data it has chosen to transmit to other BSS STAs in the EPA period with the highest priority and without the possibility of contention from other STAs in the BSS. This may be referred to herein as Downlink Contention Free (DLCF) access. When the single STA assigned the EPA period is a STA associated with the AP, then that STA may transmit its uplink data to the AP with the highest priority and without contention from other STAs in the BSS. This may be referred to herein as Uplink Contention Free (ULCF) access.

Because the EPA period is designed within the legacy CSMA timing framework, all STAs including legacy STAs may defer access to this EPA period and therefore provide channel access efficiency (and related channel throughput efficiency) improvements in environments that may be dominated by both legacy STAs and STAs that support channel access based on the EPA period.

Referring to FIG. 3A, AP 301 may transmit in a beacon frame or control frame an Uplink Priority List (UPL) 310 that lists STAs that are queued for the EPA period associated with the broadcasted frame in accordance with a sequential order identified in the UPL. The UPL may be a dynamic, ordered list of the currently authorized STAs allowed to attempt ULCF access. For example, in a sequential EPA embodiment, the UPL may list STA1 302, STA2 303, STA3 304, . . . STAn. At the beginning of the frame, the first STA on list, STA1 302 may then use the EPA period, the second STA on list, STA2 303, may then use the EPA period once STA1 302 is finished, the third STA on list, STA3 304, may then use the EPA period once STA2 303 is finished, etc. Accordingly, after each beacon frame or control frame, the EPA period may be assigned to the AP, then to STA1 302, then to STA2 303, then to STA3 304, etc.

The AP also may transmit parameters in the beacon frame or control frame that may limit the frame time for which each STA may use the EPA period (UPBurstMAX limit), and may limit the total frame time that may be used for EPA by any/all the STAs on the UPL (Priority Access Limit). For example, the first STA may have the EPA period, which may last for multiple packet transmissions up to UPBurstMAX limit. An uplink burst is a series of packet/ACK pair transmissions from a single STA during its EPA period. A STA with exclusive access may continue packet transmissions (in a single burst) until it no longer has uplink (UL) traffic or until it reaches the UPBurstMAX limit. If the STA reaches the UPBurstMAX limit, it may append an End of Burst (EOB) message to the end of the last packet. Alternatively or additionally, when a STA has reached the UPBurstMAX limit, the AP may append an EOB message to the ACK message sent in response to the last packet, or the AP may send an EOB message.

In the example of FIG. 3A, STA1 302 first has the EPA period and therefore transmits data 311a to the AP 301. STA1 302 may then pass the EPA period access to the next STA in the list at any time by sending an EOB message 311b. The STAs that are listed on the UPL may be aware of which STA is currently transmitting, and if they are the next STA in the UPL, they may start their own EPA transmissions when they have receive the EOB message from the AP indicating that the STA preceding them is now done. In this way an EOB message may cause the EPA assignments to shift to the next STA listed in the UPL.

Accordingly, as shown in the example procedure of FIG. 3A, AP 301 may send an EOB message 312a to STA2 303 indicating that STA1 302 has completed its EPA transmission. STA2 303 may then start an EPA transmission 312b and transmit an EOB message 312c to AP 301 when complete. Similarly, AP 301 may send an EOB message 313a to STA3 304 indicating that STA2 303 has completed its EPA transmission. STA3 304 may then start an EPA transmission 313b and transmit an EOB message 313c to AP 301 when complete.

Alternatively, the EOB message may be received by the next STA in the UPL from the STA preceding it in the UPL.

In yet another alternative, indicating the end of EPA transmission by a STA may be accomplished by noting that the allowed time limit for that STA has expired.

In yet another alternative of the procedure of FIG. 3A, AP 301 may acknowledge the EOB from a STA and then transmit the EOB message to all other STAs. The transmission may be a broadcast transmission. All STAs on the UPL may monitor the AP for these EOB message broadcasts. When a STA receives an EOB message from the AP, it may reassign its own EPA period based on its position in the UPL. Each EOB message broadcast by the AP may contain the UPL position number of the STA which sent the EOB message to the AP.

In another alternative to the procedure of FIG. 3A, at the end of the UPL the list may wrap back to the beginning of the UPL to the STA in the first position, e.g. STA1 301. When a STA receives an EOB message from the AP, it may reassign its priority as it does when receiving an EOB message, and it may also delete the STA which sent the EOB message from the UPL.

The AP may also coordinate EPA priorities and synchronize the UPL using EOB message transmissions. If a STA that is assigned an EPA period does not transmit in its turn in the UPL, it may lose its ULCF access for this transmission period, and the AP may end its ULCF opportunity by the transmission of an EOB message, which may enable the next STA on the UPL to begin its transmissions.

If a STA is interrupted during its burst transmission for any reason and does not send an EOB message, it may lose its ULCF access for the remainder of its transmission period. This may be detected by all UPL STAs as an out of order EOB message reception. EOB messages may normally be received in descending order from the STA holding the first position of the UPL to the STA holding the last position of the UPL. If an EOB message indicates that an EOB message was skipped, the STA in the UPL position of the skipped EOB message may be deleted from the UPL. This may allow all UPL STAs to synchronize priorities even when STAs experience failures or temporarily lose synchronization with other STAs.

The number of STAs on the UPL may be an important dynamic parameter that may also be modified on a frame by frame basis by the AP. If the number of STAs on the list is low enough, some or all of the STAs on the list may be able to completely empty all their UL traffic queues. The number of STAs in the UPL may be one of the parameters that the AP may use to throttle the access delays of all of the ULCF access capable STAs in the BSS. This may be done if the AP wants to provide allocations which do not favor new STAs but attempts to equalize the access delay experienced by new and legacy STAs alike.

In a second EPA embodiment, the UPL may, for example, list STA1, STA2, STA3, . . . STAn, and each STA may be assigned a different EPA period (e.g. EPAx). At the beginning of the frame, the first STA on list, STA1 may use a priority access delay time of EPA1, the second STA on list, STA2, may use an access delay time of EPA2, the third STA on list, STA3, may use an access delay time of EPA3, etc. In this embodiment, STA1 will get access to the medium first because its assigned access delay, EPA1, is shorter than EPA2, EPA3, . . . EPAn. As a result, the medium is busy for STA2 and STA3 during EPA1. When STA1 has completed its transmissions and stops contending for the medium, STA2 may then have access to the medium because its access delay, EPA2, is shorter than that of the subsequent devices on the UPL. Similarly, when STA2 has completed its transmissions and stops contending for the medium, STA3 may then have access to the medium because its access delay, EPA2, is shorter than that of the subsequent devices on the UPL.

Figure 3B:
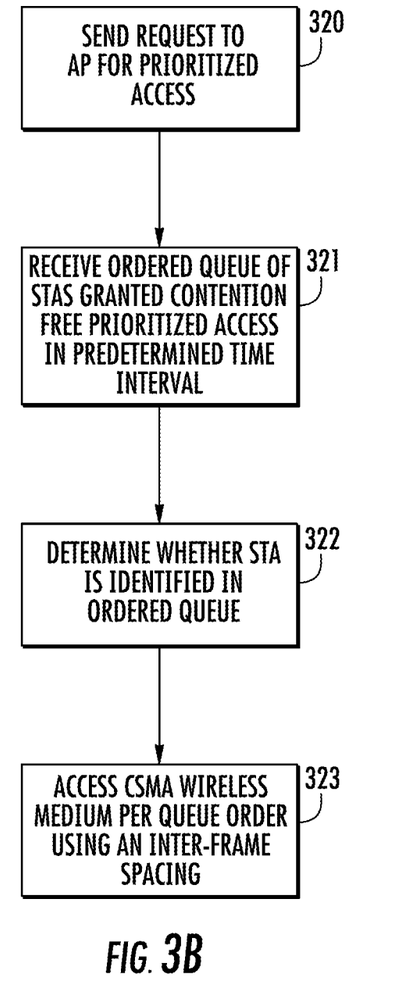
FIG. 3B is a flow diagram of an example procedure in which a STA may request and reserve uplink contention free (ULCF) access.

The AP may continuously maintain the UPL. FIG. 3B is a flow diagram of an example procedure in which a new STA may request and reserve ULCF access via the UPL. A STA may send a request to its associated AP for prioritized access 320. This request for access may be sent in a unicast management frame during the legacy CSMA access period or during its assigned CF period. This special management frame request may be sent, for example, with priority Point Coordination Interframe Space (PIFS), Priority EPA1, another Priority EPA, standard CSMA, or this request may be appended on to any UL message sent by the STA, including management frames, data frames, and ACKs. The STA may then receive an ordered queue of STAs granted contention free prioritized access in a predetermined time interval 321. This reply from the AP may be a beacon frame, control frame, or management frame sent using a PIFS priority, another Priority EPA, or a standard ACK to the STA indicating that it has been added to the UL Reservation Queue (URQ). Once a STA receives an acknowledgement from the AP that it has been added to the URQ, it may not send another reservation request until it has waited to transmit during the EPA period in accordance with its position per the queue. The STA may then determine whether it is identified in the ordered queue 322, and then may access the CSMA wireless medium per the queue order using an inter-frame spacing 323. In the sequential EPA embodiment, the inter-frame spacing may be a PIFS or Distributed coordination function (DCF) Interframe Space (DIFS). In the embodiment in which each STA has a unique assigned predetermined time interval for prioritized access (e.g. each STA is assigned EPAx), the inter-frame spacing would be different for each EPAx.

Access to contention free UL time may be assigned on a first come first serve basis, based on requests received at the AP in accordance with the procedures above. The AP may create the UPL from the top of the entries of the URQ, i.e., the oldest entries. The AP may set the number of STAs on the UPL to suitably fit the size of the ULCF period. Alternatively or additionally, the AP may use a different criterion for assigning the STA priority in the UPL. For example, the assignment may be based on a priority given to a STA by the AP or an external entity, a scheduler, an external entity, or another AP which has the capability to assign STA priority. When the STA that is transmitting in the ULCF period ends its transmission with an EOB message (or loses UPL synchronization), the AP may delete the STA from the UPL and also from the URQ. A STA deleted from the UPL may make a new reservation for ULCF access using the procedures described above. In this way the AP may verify that STAs on the UPL continue to use the contention free resources assigned to them.

In some systems, the number of STAs on the URQ may exceed the number of STAs in the UPL. It may also be possible that the UPL lists all of the STAs in the URQ. This may indicate to the AP that it may have over-allocated ULCF time. One example resolution may include setting the average URQ size to be approximately 1.5× the UPL size, indicating a reasonable ULCF allocation in a non-overloaded channel. Alternatively, if the AP is not sending a response to the management frame requesting ULCF access, it may be beneficial to have the UPL and URQ be identical.

If an AP allocates time to the ULCF period of a frame such that all STAs on the UPL complete their UL transmissions, there may be no negative impact (e.g. waste of channel access time). After the STAs with ULCF access complete their transmissions, non-ULCF and legacy CSMA STAs may begin use of the channel without any wasted channel time, since they may see the channel as available and contend for channel access as they normally would.

As stated above, if a STA assigned an EPA period does not transmit in its turn, it may be deleted from the UPL just as if it had completed its transmission with an EOB message. This condition may be indicated to the other STAs by the AP transmitting an EOB message in response to no reception from the STA. If a STA does not begin transmission at the beginning of its turn, the AP may transmit an EOB message for that STA.

A fixed or variable timeout for AP detection of a STA not transmitting during its turn may be used. The AP may need to stop further transmissions from a STA, for example if the STA is taking too long to complete the transmission. In this case, early termination of a transmission may be indicated by the AP broadcasting an EOB message in response to a STA sending an EOB message. This may allow the STA to know that it is no longer in the UPL and also allow the AP to open up the normal CSMA period. A STA receiving an EOB message from the AP immediately following transmission of an EOB message may know it has been removed from the UPL.

In the event that a STA receives an EOB message with an unexpected UPL STA count (i.e., more or fewer STAs in the UPL than expected), that STA may refrain from transmitting until the next beacon is received containing the UPL.

Alternatively, if an AP detects that a STA does not start its transmission when it is supposed to, it may remove that STA from the UPL and immediately transmit a new (complete) UPL to update the other STAs. If the AP receives a transmission from any STA that was not expected to transmit during the current frame time, the AP may re-transmit the complete UPL immediately following the STA's transmission.

In some systems, there may be a case in which the AP does not send a response to the management frame requesting ULCF access. In this case the STA may assume that the request was received for the rest of the frame. In this alternative procedure, the STA may not send an additional request until it receives the UPL from the AP and determines that it is not on the UPL.

Figure 4:
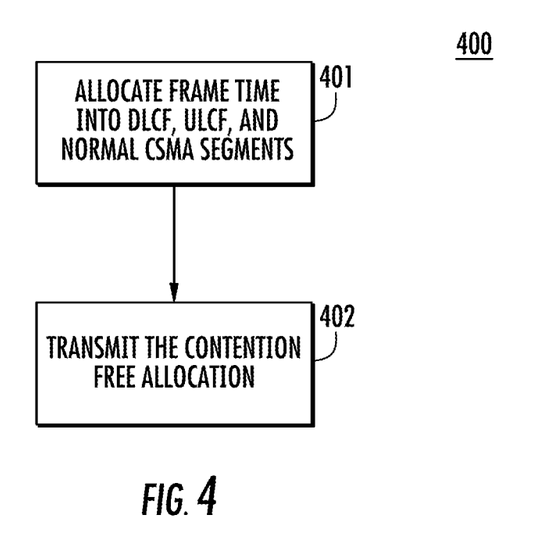
FIG. 4 is a is a flow diagram of an example procedure in which an AP may implement Exclusive Priority Access (EPA)

FIG. 4 is a flow diagram of an example procedure 400 in which an AP may implement EPA, which may be used in combination with any of the embodiments described herein. An AP may dynamically allocate frame time 401 into DLCF, ULCF, and normal CSMA segments. The AP may control channel access by assigning frame time (a beacon period or multiple beacon periods) into these three segments: CSMA access for legacy STAs and other STAs (IEEE 802.11 contention based access), DLCF for the AP, and ULCF for STAs capable of EPA behavior. The AP may modify these allocations on a frame by frame basis as the number of STAs, traffic demand, and ratio of STAs supporting channel access based on EPA to legacy STAs change. Also these allocations may be usage allocations rather than based on fixed time boundaries in a frame. The ULCF and DLCF may not be continuous periods and some CSMA access may be included between the CF periods.

The AP may then broadcast the Contention Free (CF) allocation 402. In all or some beacons, the AP may transmit an allocation limit that defines the frame utilization (e.g. as a percentage of frame time or an actual time) which may be used for contention free access, which is the sum of the ULCF and DLCF. This CF allocation may also be referred to as the Priority Access Limit (PAL) and may define the end of the contention free allocation of the frame. The PAL may also indicate the beginning of the period in which legacy CSMA STAs, other APs, or STAs in other BSSs may access the channel. During this period, STAs capable of EPA behavior do not use their EPA capability and instead may contend with deferred access to legacy STAs.

The PAL allocation may be as high as 90-95% of the frame, which implies that the legacy CSMA access period may be as low as 5%-10% of the frame. A portion of the frame may also be allocated for CSMA for probe requests, association requests, and other unplanned packets which may be received by the AP.

Figure 5:
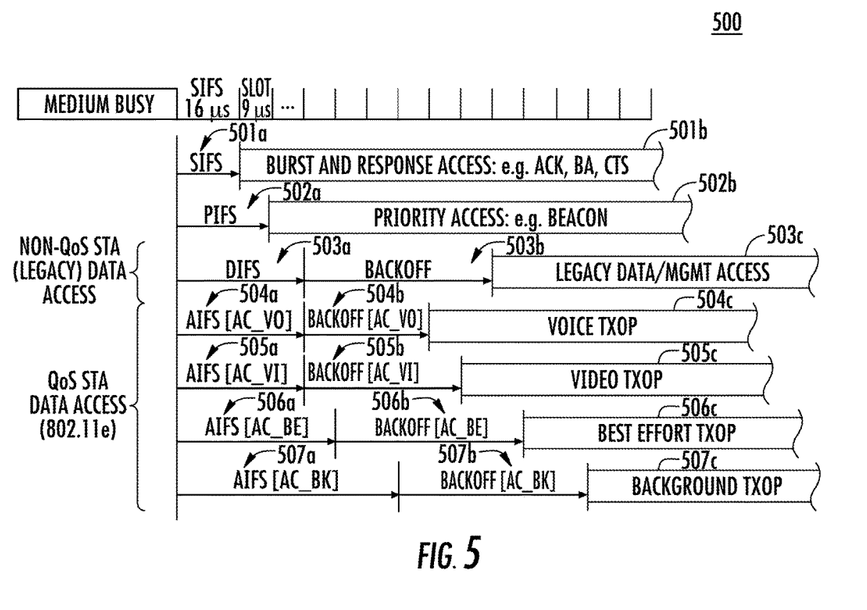
FIG. 5 is a diagram of the IEEE 802.11e CSMA priority levels, with an indication of the EPA priority level.

The EPA may be implemented in a number of ways. FIG. 5 is a diagram showing the various IEEE 802.11e priority levels 500. Acknowledgments (ACK), block acknowledgments (BA), and clear-to-send (CTS) messages 501*b* may be sent after a Short Interframe Space (SIFS) 501*a*. Beacon messages 502*b* may be sent after a PIFS 502*a*. Legacy data and management access 503*c* may be permitted following a Distributed Coordination Function (DCF) Interframe Space (DIFS) 503*a* and back off period 503*b*. A voice transmit opportunity (TXOP) 504c may be permitted following an Arbitration Interframe Space (AIFS) for the voice access category (AC_VO) 504a and back off period 504b. A video TXOP 505c may be permitted following an AIFS for the video access category (AC_VI) 505a and back off period 505b. A best effort TXOP 506c may be permitted following an AIFS for the best effort access category (AC_BE) 506a and back off period 506b. A background TXOP 507c may be permitted following an AIFS for the background access category (AC_BK) 507a and back off period 507b.

EPA may use PIFS access and may use a single defined PHY access priority level. Alternatively, EPA may use two or more newly defined PHY access priority levels shorter than DIFS to provide robustness to accommodate for loss of synchronization and other error conditions. In accordance with the embodiments described herein, the AP may use the EPA period for all downlink data as well as for beacons. This may permit the AP to eliminate all contention for DL data, as no other entity in the BSS would be using EPA during the DLCF time period. The AP may decide how much frame time to allocate for DL data based on its DL queue size, the number of STAs requesting UL traffic, the duration of the requested UL times, the number of STAs preset and contending for the channel, and other factors. The AP may also decide the allocated frame time based on messages received from higher layers, schedulers, other APs, or any other source. The AP may stop DL transmission when it reaches the DL maximum time or when it runs out of downlink data. There may be no need to broadcast to STAs the DL/UL time partition, as it may be an internal variable only used by the AP. The initial backoff time for all EPA priorities may be set to zero. Collisions are possible, but only from other new (i.e. HEW) STAs using the same EPA period in an Overlapping Basic Service Set (OBSS) scenario.

In the sequential EPA embodiment described above, the APs and STAs may use PIFS 502a for EPA access. If PIFS 502a are used then the right to use PIFS 502a may be passed from one AP or STA to the next, in accordance with the procedures described herein for the sequential EPA embodiment described above. This may be done by the AP using PIFS 502a until it has completed its transmissions and then by sending an EOB. Then the first STA on the UPL, upon receiving the EOB message from the AP, may begin transmitting using PIFS 502a until it has completed its transmissions. The STA may then send an EOB. Similarly, the next STA on the UPL, upon receiving the EOB message from the STA preceding it on the UPL or the AP, may then begin to transmit using PIFS 502a, and so on until all of the STAs have completed their transmissions or the time window for ULCF access has expired. Alternatively, rather than using PIFS, other inter-frame spacing may be used including but not limited to DIFS, for example.

In the embodiment in which each STA has a unique EPA period (e.g. EPAx), there may also be a small set of new EPA access priorities that are defined with priority greater than (i.e. shorter duration than) AIFS (AC_VO) 504a, but with priority less than (i.e. longer duration than) PIFS 502a. These may be, for example, defined as the EPA levels for the assigned UL users and may be ordered EPA1, EPA2, EPA3 and EPA4, where the access delays are defined by: EPAx=PIFS+(x)slots. Note that the access delays for AIFS and lower priorities may be greater than EPA4. The initial backoff time may be set to zero for the four EPAx access priorities. Collisions may be possible, but only from OBSSs with the same priority. While four access priorities are used herein, this number is merely exemplary, and more or fewer access priorities may be used.

Figure 6A:
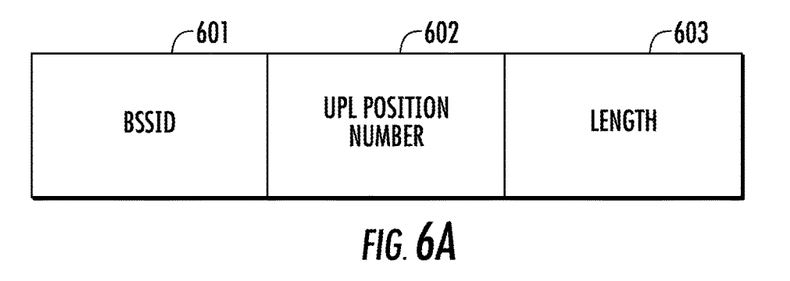
FIG. 6A is a diagram of an example end of burst (EOB) that may be used to perform the above synchronization functions.
Figure 6B:
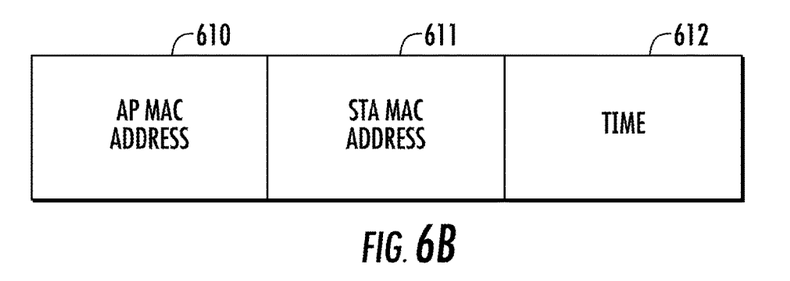
FIG. 6B is a diagram of another example EOB message that may be used to perform the above synchronization functions.
Figure 6C:
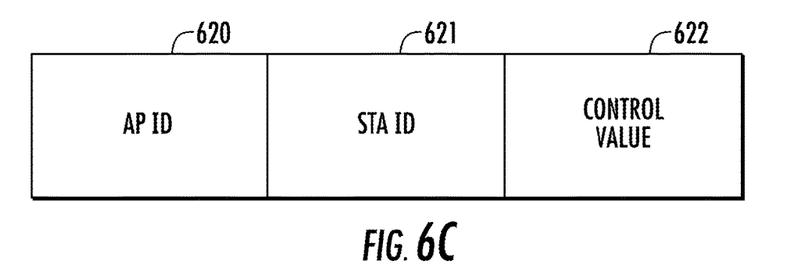
FIG. 6C is a diagram of yet another example EOB message that may be used to perform the above synchronization functions.

FIG. 6A-6C are diagrams of example EOB messages 600 that may be used to perform the above synchronization functions in the sequential EPA embodiment described above. Each EOB may contain a BSS identifier including but not limited to a BSSID or the MAC address of the AP. The EOB may also include an identifier of the STA including but not limited to a UPL position number, STA ID, or the MAC address of the STA. The EOB may further include, but is not limited to, a control value, time value, length value, or other information.

In the example of FIG. 6A the EOB contains the BSSID 601 of the AP (for OBSS reasons), the UPL position number 602 of the STA which just completed a transmission, and also the length 603 (number of STAs) included in the current UPL. If a STA on the UPL receives an EOB indicating fewer STAs on the UPL than it has stored locally, the STA may assume that it is out of sync and may act as if it had transmitted an EOB message. The STA may assume that it has been deleted from the UPL.

In the example of FIG. 6B the EOB contains the MAC address of the AP 610 (for OBSS reasons), the MAC address of the STA 611 which just completed a transmission, and also a time 612 value. The time 612 value may associated with the UPL, which for example may be a time limit assigned to the STA that just completed its transmission or a timeout associated with the STA not transmitting during its position on the UPL.

In the example, of FIG. 6C, the EOB contains an identifier for the AP 620 (for OBSS reasons), an identifier for the STA 621 which just completed a transmission, and also a control value 622 associated with the UPL.

In another embodiment, in order to increase power saving for legacy STAs in a BSS, an AP may transmit a clear to send (CTS)-to-self at the beginning of the DLCF period. This CTS-to-self may cause all legacy STAs to defer to CSMA access rules until their Network Allocation Vectors (NAVs) expire at the end of the CTS period. The AP may judiciously select the CTS period so as not to waste channel time by setting the NAV so that it only covers a portion of the CF period of the frame, which it is reasonably sure will be used by various CF capable STAs. Hence, the CTS period may be set to be larger than the DLCF period, but shorter than the sum of the DLCF and ULCF. If the AP sets the CTS period to the maximum, and if the STAs on the UPL fail to fill the entire ULCF, then the remainder ULCF period may not be used by legacy STAs and may be wasted idle channel time. To reduce the possibility of having wasted idle channel time, different means of applying CTS-to-self may be implemented by the AP or the STA assigned ULCF access. For example, an AP may send a CTS to set the NAV of all STAs in the BSS to the time that it assumes that it will be using the channel for DLCF access. A STA which has ULCF access may send a CTS to set the NAV of all of the STAs in the BSS to the time when it assumes it will be using the channel.

STAs that support channel access based on EPA may perform traffic queue management in accordance with yet another embodiment, which may be used in combination with any of the embodiments described herein. For example, STAs which transmit with EPA during the ULCF period may transmit traffic from a "compound traffic queue" which includes all existing traffic queues ordered by their normal legacy priorities. That is, if an EPA STA has UL traffic queued in the AC_VO, the AC_BE, and the AC_BK, it may first transmit all traffic on its AC_VO queue, then the traffic on the AC_BE queue, then finally the traffic on its AC_BK queue. When all the queues are depleted the STA may transmit an EOB message.

APs in OBSS may coordinate EPA periods in accordance with yet another embodiment, which may be used in combination with any of the embodiments described herein. Since EPA priority levels may operate with zero backoff, any other STA using the same EPA level from an OBSS may cause a collision. In an OBSS scenario, the APs may implement time coordination among themselves to limit these unwanted collisions. The goal of the time coordination may be to limit the use of EPA on any channel where there are overlapping BSSs so that only one BSS at a time is using the EPA period. The coordination among APs may be done in several ways. The ways described herein are based on use of the Network Time Protocol (NTP), which is used in every AP for time of day (TOD) function.

A simple distributed control method for AP time coordination may be based on using the TOD clock. In this example it is assumed that the beginning of the first second of each hour is used for time sync and defines a one hour period consisting of 36,000 100 msec time blocks (TBs), from TB1 (first) to TB36000 (last). If an AP detects an OBSS condition by receiving beacons from other APs on its operating channel, it may limit its own use of the EPA period to a fraction of the total time. For instance, if two other APs are detected in the OBSS, the AP may limit its EPA period use to ⅓ of the total time available for EPA period use. This may be implemented by the AP using every third TB for EPA. The APs may coordinate among themselves to use different TBs to avoid EPA collisions. Without this coordination, the APs may randomly choose the first, second, or third set of TBs for their own use. Alternatively, the BSSID may be used to determine which set of TBs may be used at each AP. This rule may allow an AP to use EPA only when (TB number)mod3=(BSSID)mod3.

Centrally controlled AP time coordination may also be provided by a network based server which may be accessed by all APs in the OBSS situation. The server may then assign each of the three APs a unique coordination number (UCN), in this case either 1, 2, or 3. This rule may allow an AP to use EPA only when (TB number)mod3=UCN. Other coordination schemes are possible.

An alternative scheme to mitigate collisions in OBSS scenarios may be to implement normal random backoff time with small initial CSMA contention windows for the new EPA priorities. In an OBSS scenario, the AP may modify the EPA backoff rule for EPAx, replacing the zero initial backoff with a very small (2-8 timeslot) initial contention window with an initial random backoff time. The maximum number of contending STAs for ULCF or DLCF may be equal to the number of overlapping BSSs in radio range. This may be a very small number. Accordingly, a very small initial contention window may be appropriate to counter the OBSS effect. The contention window size used for EPA, however, may be added as a required additional backoff delay for all other legacy CSMA access priorities.

In the embodiments described above, the AP may allocate time for ULCF and DLCF, and the remaining time may default to normal CSMA access. The AP may not act as the point controller in that it may make no decisions about who gets UL access. Access reservation may be distributed among all new STAs on a first come, first serve basis and may be maintained by an AP in a first in, first out (FIFO) URQ. Thus, it is different from PCF, but includes the advantages of an efficient reservation scheme.

This reservation scheme need not be based on fixed time assignments. UL EPA period time by each STA may end when the STA runs out of UL traffic or when the STA exceeds the UPBURSTMAX limit. Thus this scheme avoids the slot packing problem associated with fixed time reservations, and also the packet size message parsing issues which arise when trying to do slot packing.

Access efficiency for the DLCF and ULCF periods may be near 100% and is achieved by adjusting the CSMA parameters as described above. In other words, this scheme may reduce contention by limiting the contention pool to a size of one and only one STA. This is the exclusivity element of this priority access scheme. This access improvement may be far better than improvements gained by grouping STAs in fixed contention groups. However, STAs in the UPL may need to monitor ULCF transmissions to maintain UPL synchronization and to adjust their own EPA period accordingly. The EOB message mechanisms may facilitate this.

The AP may over-allocate DLCF and ULCF without wasting channel resources because the new legacy STAs may assume normal CSMA rules. If the AP over-allocates the DLCF, it may end DL transmission before the planned beginning of the ULCF. The AP may send an EOB message to notify the next STAs in the queue that it is allowed to begin UL transmissions. In this case the STAs in the UPL may immediately sense the end of DLCF or receive the EOB and may begin ULCF transmissions. The new STAs may not know about the allocated DLCF period; they may use their assigned EPA periods to contend for access with the AP. If the AP over-allocates the ULCF time, the legacy STAs may use the excess time as normal CSMA time. That is, because they operate with CSMA, if the STAs on the UPL run out of UL traffic, they may cease transmissions, and the legacy STAs may contend for the remaining time. In this way, the AP may favor new STAs with efficient access and may over-allocate DLCF/ULCF knowing that any unused time may immediately be used by legacy STAs. Note that the AP's aggressive use of CTS-to-self may defeat this efficiency by preventing legacy STAs from using idle portions of the ULCF.

Since the priority access time per STA is variable, all STAs (with priority access EPAx) may continuously try to access the channel until the legacy CSMA access window. Since these STAs have different access delay times, they may not contend with each other. OBSS STAs using this access scheme may permit other STAs from other BSSs to contend (with certain collision) with the priority UL STAs here. However this may only happen when the ULCF periods of the two OBSSs are time aligned. In this regard, the unsynchronized nature of OBSSs aids the operation of this new access mechanism by randomly reducing contention among OBSSs. If an AP finds that its ULCF happens to be synchronized with another OBSS, it may restart the BSS using a different beacon period to ensure that ULCF alignment is never synchronized but overlaps in sliding fashion. Alternatively, the AP may choose to implement the AP time coordination feature described above.

Hidden node and limited propagation across a BSS may cause a STA on the UPL to lose synchronization with the correct dynamic ordering of the list maintained by the AP. This error may be corrected at each beacon transmission when the AP transmits the current UPL to all STAs. This loss of synchronization may further be compensated for within each beacon by using more than one EPA priority level, even though one EPA period (or none when using PIFS) is sufficient for this solution scheme. If a STA using EPA1 loses synchronization and fails to begin or continue burst transmission as planned, the STA using EPA2 may immediately begin transmission in place of the STA which failed to transmit using EPA1. Finally, even though this example describes a distributed system which allows four new high priority EPA access levels (or non when using PIFS), the AP may have the flexibility to further modify the priority through selective management of the URQ. If a STA could communicate to the AP that it should have higher priority for access than the FIFO URQ list would allow, the AP may process that STA's request for UL access differently from the other STAs' requests. If the AP concurred that the STA should get higher priority than FIFO, it may immediately place that STA at the top of the URQ instead of at the end of the URQ. This may be an advantage for use in Public Safety situations when Fire or Police units may immediately take priority. The same may apply for any 911 call situation, and other situations. By allowing the AP to manage the FIFO access list with selected exceptions, this scheme permits the evolution of EPA to other more complicated priority schemes that may be implemented in software and by URQ management. The AP may also consider inputs from another entity (e.g. a Controller) to order the priority of the STAs requesting EPA.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA) to enable scheduled priority access in an Institute of Electrical and Electronics Engineers (IEEE) 802.11 network, the method comprising:
   sending a request for prioritized access to an access point (AP);
   receiving, from the AP, a message including a list of a plurality of STAs, the list indicating an order of the plurality of STAs, to enable contention free prioritized access in a predetermined time interval;
   determining whether the STA is identified in the list; and
   on a condition that the STA is identified in the list, accessing a Carrier Sense Multiple Access (CSMA) wireless medium associated with the IEEE 802.11 network, in turn with other STAs in the list per the order during the predetermined time interval using an inter-frame spacing, thereby enabling contention free access.

2. The method of claim 1, wherein the list is included in a beacon frame.

3. The method of claim 1, wherein the list is included in a control frame.

4. The method of claim 1, wherein the inter-frame spacing is a Point Coordination Interframe Space (PIFS).

5. The method of claim 1, wherein the inter-frame spacing is a Distributed coordination function (DCF) Interframe Space (DIFS).

6. The method of claim 1, further comprising:
   receiving an end of burst (EOB) message from the AP indicating that a preceding STA in the list order has completed accessing the CSMA wireless medium.

7. The method of claim 1, wherein each STA in the list is assigned a unique predetermined time interval for prioritized access.

8. The method of claim 1, further comprising:
   receiving, from the AP, an allocation of a frame to be used for contention free access.

9. The method of claim 1, wherein the predetermined time interval comprises a random backoff time.

10. The method of claim 1, wherein the inter-frame spacing is shorter than an inter-frame spacing used by STAs not on the list.

11. A station (STA) configured to enable scheduled priority access in an Institute of Electrical and Electronics Engineers (IEEE) 802.11 network, the STA comprising:
    a transmitter configured to transmit a request for prioritized access to an access point (AP);
    a receiver configured to receive, from the AP, a message which includes a list of a plurality of STAs, the list indicating an order of the plurality of STAs, to enable contention free prioritized access in a predetermined time interval;
    a processor configured to determine whether the STA is identified in the list; and
    the transmitter further configured to, on a condition that the STA is identified in the list, access a Carrier Sense Multiple Access (CSMA) wireless medium associated with the IEEE 802.11 network, in turn with other STAs in the list per the order during the predetermined time interval using an inter-frame spacing, thereby enabling contention free access.

12. The STA of claim 11, wherein the list is included in a beacon frame.

13. The STA of claim 11, wherein the list is included in a control frame.

14. The STA of claim 11, wherein the inter-frame spacing is a Point Coordination Interframe Space (PIFS).

15. The STA of claim 11, wherein the inter-frame spacing is a Distributed coordination function (DCF) Interframe Space (DIFS).

16. The STA of claim 11, further comprising:
    the receiver further configure to receive an end of burst (EOB) message from the AP indicating that a preceding STA in the list order has completed accessing the CSMA wireless medium.

17. The STA of claim 11, wherein each STA in the ordered queue is assigned a unique predetermined time interval for prioritized access.

18. The STA of claim 11, further comprising:
    the receiver further configure to receive, from the AP, an allocation of a frame to be used for contention free access.

19. The STA of claim 11, wherein the predetermined time interval comprises a random backoff time.

20. The STA of claim 11, wherein the inter-frame spacing is shorter than an inter-frame spacing used by STAs not on the ordered queue of the plurality of STAs.

* * * * *

UNITED STATES PATENT AND TRADEMARK OFFICE
CERTIFICATE OF CORRECTION

PATENT NO. : 10,080,238 B2
APPLICATION NO. : 15/035123
DATED : September 18, 2018
INVENTOR(S) : Joseph S. Levy, Joseph A. Kwak and Ronald Murias It is certified that error appears in the above-identified patent and that said Letters Patent is hereby corrected as shown below:

In the Claims

Claim 16, Column 18, Line 47, after "the receiver further", and before "to receive an end of burst", please replace "configure" with --configured--.

Claim 18, Column 18, Line 55, after "the receiver further", and before "to receive, from the AP, an", please replace "configure" with --configured--.

Signed and Sealed this
Twenty-sixth Day of March, 2019

Andrei Iancu
*Director of the United States Patent and Trademark Office*